United States Patent [19]

Rosenberg

[11] Patent Number: 5,493,522

[45] Date of Patent: Feb. 20, 1996

[54] FAST ARITHMETIC MODULO DIVIDER

[75] Inventor: Jonathan Rosenberg, North Plainfield, N.J.

[73] Assignee: Northrop Grumman Corporation, Los Angeles, Calif.

[21] Appl. No.: 309,641

[22] Filed: Sep. 21, 1994

[51] Int. Cl.[6] .................................................. G06F 7/72
[52] U.S. Cl. .................................................. 364/746
[58] Field of Search ............................... 364/746, 746.1

[56] References Cited

U.S. PATENT DOCUMENTS

| | | | |
|---|---|---|---|
| 4,567,568 | 1/1986 | Inagawa et al. | 364/746.1 |
| 4,574,361 | 3/1986 | Inagawa et al. | 364/746.1 |
| 4,975,867 | 12/1990 | Weng | 364/746.1 |
| 4,994,995 | 2/1991 | Anderson et al. | 364/746.1 |
| 5,379,243 | 1/1995 | Greenberger et al. | 364/746.1 |

*Primary Examiner*—David H. Malzahn
*Attorney, Agent, or Firm*—Terry J. Anderson; Karl J. Hoch, Jr.

[57] ABSTRACT

A circuit and method for carrying out high-speed ripple-through modulo division includes input registers for inputting two modulo 32 numbers A and B. The output of the circuit is a modulo 32 number Q, where A, B, and Q are related by the equation B*Q mod 32=A. The circuit generates a modulo division operator $M_B$ which is the inverse of B when B is odd, but which is equal to $2^n$, n=1, 2, 3, 4, when B is even. Combinational logic is used to calculate the product $M_B A$, which is then divided by $2^n$, or sifted n places, to obtain Q.

31 Claims, 6 Drawing Sheets

FIG. 1

Data Encoded in ROM 4

| Input (B) | Output ($M_B$) | n |
|---|---|---|
| 0 | 0 | 0 |
| 1 | 1 | 0 |
| 2 | 1 | 1 |
| 3 | 11 | 0 |
| 4 | 1 | 2 |
| 5 | 13 | 0 |
| 6 | 11 | 1 |
| 7 | 23 | 0 |
| 8 | 1 | 3 |
| 9 | 25 | 0 |
| 10 | 13 | 1 |
| 11 | 3 | 0 |
| 12 | 3 | 2 |
| 13 | 5 | 0 |
| 14 | 7 | 1 |
| 15 | 15 | 0 |
| 16 | 1 | 4 |
| 17 | 17 | 0 |
| 18 | 9 | 1 |
| 19 | 27 | 0 |
| 20 | 5 | 2 |
| 21 | 29 | 0 |
| 22 | 3 | 1 |
| 23 | 7 | 0 |
| 24 | 3 | 3 |
| 25 | 9 | 0 |
| 26 | 5 | 1 |
| 27 | 19 | 0 |
| 28 | 7 | 2 |
| 29 | 21 | 0 |
| 30 | 15 | 1 |
| 31 | 31 | 0 |

Critical Path

|  | Gate | Block | Individual Delay(ns) | Cumulative Delay(ns) |
|---|---|---|---|---|
| START | Register | NA | 3.4 | 3.4 |
| TO | NI Buffer | ROM | 1.9 | 5.3 |
|  | 5 in NAND | ROM | 2.2 | 7.5 |
|  | 8 in AND | ROM | 2.8 | 10.3 |
|  | 2 in NAND | ROM | .6 | 10.9 |
|  | 2 in AND | Multiplier | 1.5 | 12.4 |
|  | 2 in AND | Multiplier | 1.5 | 13.9 |
|  | 4 in NAND | Multiplier | 1.2 | 15.1 |
|  | 6 in AND | Multiplier | 2.6 | 17.7 |
|  | NI Buffer | Multiplier | 1.4 | 19.1 |
|  | 5 in NAND | Multiplier | 2.4 | 21.5 |
|  | 6 in AND | Multiplier | 1.3 | 22.8 |
|  | 2 in AND | Multiplier | 1.3 | 24.1 |
|  | 3 in XOR | Multiplier | 2.6 | 26.7 |
|  | 2 in NAND | Shifter | .8 | 27.5 |
| END | 5 in NAND | Shifter | 2.0 | 29.5 |
| TOTAL |  |  |  | 29.5 |

FIG. 6

FAST ARITHMETIC MODULO DIVIDER

BACKGROUND OF THE INVENTION

1. Field of the Invention

This invention relates to circuitry and an electrical signal processing method for performing high-speed ripple-through modulo division operations.

2. Description of Related Art

Modulo division is used in digital computing devices such as arithmetic logic units (ALU's) and as part of address generators. The purpose of modulo division is to divide two X-bit digital input signals A and B and derive a single X-bit digital output signal Q in the form:

$$(B*Q) \bmod 2^x = A \quad (1)$$

where $\bmod 2^x$ indicates a modulo operation, which by definition is equivalent to an operation of the form:

$$B*Q = A + 2^x n \quad (2)$$

where n is a whole number.

For a modulo 32 system, which uses a 5-bit input, the corresponding equations describing the modulo relationship between A, B, and Q are:

$$(B*Q) \bmod 32 = A \quad (3)$$

and $$B*Q = A + 32n \quad (4)$$

where A, B, and Q are between 0 and 31.

In order to simplify the notation used herein, an equal sign with a 32 under it (=) will hereinafter specify equivalence under modulo 32, and an equal sign without any notation under it will specify regular equivalence. In addition, M(32) denotes modulo-32 arithmetic. It is to be understood, however, that modulo 32 arithmetic, in which X=5, is to be taken as an illustrative example only, and that the principles discussed herein may easily be generalized to cover the case where X is any positive integer greater than 1, although the modulo arithmetic for X less than 5 is essentially trivial.

A wide variety of modulo division circuitry is available at present, but most such circuitry is limited in the speed at which modulo numbers A and B can be processed. This limitation is related to a property of modulo division which makes it impossible, using conventional methods, to multiply A by the inverse of B in order to obtain the quotient Q of A and B. While all odd numbers in the modulo system have defined inverses, no even number in the modulo system has a defined inverse. Thus, conventional modulo division circuitry relies upon iterative "long division" techniques involving multiple shift registers to perform successive multiply and accumulate operations, each of which must be separately clocked in order to coordinate operations, greatly reducing processing speed.

SUMMARY OF THE INVENTION

Despite the above-described theoretical obstacle to improving the speed of modulo division circuitry, it is nevertheless an objective of the invention to provide a modulo divider circuit of improved speed.

It is a further objective of the invention to provide a modulo divider circuit which avoids the need for iterative division techniques involving multiple clocked registers, the clocked registers being used only to store initial inputs and the final result.

It is a still further objective of the invention to provide a method of carrying out modulo division by using combinational logic circuitry to obtain an output signal which represents the modulo quotient of two modulo inputs A and B.

These and other objectives of the invention are accomplished by providing circuitry which creates an inverse modulo division operator $M_B$ defined as follows:

$$M_B B = \frac{2^n}{32} \quad (5)$$

where n is defined as the number of twos by which B is integrally divisible. Under this definition of n, if B is odd, then n is zero. If B is even, on the other hand, then n is an element of the set (1, 2, 3, 4), and depends on the value of B. With n defined in this manner, the inverse modulo division operator $M_B$ is simply the inverse of B if B is odd. If B is even, then $M_B$ is a number between 0 and 31 which fits the definition provided by equation 5.

Application of the modulo division operator $M_B$ is accomplished by the inventive modulo division circuitry as follows: Multiplication of both sides of equation 1 by the operator $M_B$ yields $$M_B QB = \frac{AM_B}{2^x} \quad (6)$$

Therefore, by equation 5 and the commutative property of modulo division, $$2^n Q = \frac{AM_B}{2^x} \quad (7)$$

and $$Q = \frac{AM_B/2^n}{2^x} \quad (8)$$

In other words, the invention accomplishes modulo division by processing the electrical input signals to obtain electrical signals representative of the product of a modulo division operator $M_B$ and one of the input signals A, and then divides the result by $2^n$, the latter operation being effected by shifting the 5-bit digital signal representing the product $AM_B$ to the right n times, and by dropping the rightmost bit after each shift.

By generating and applying the modulo division operator $M_B$ as described above, only six functional electrical circuit elements are needed to carry out the invention. The six functional elements are:

1. Input registers for receiving modulo numbers A and B.
2. A look-up table, preferably in the form of a ROM, for generating $M_B$ by mapping B to $M_B$.
3. A masker circuit which generates a value of $2^n$ that corresponds to the value of B.
4. A multiplier, preferably in the form of a modulo-32 ripple-through multiplier, for multiplying A and $M_B$.
5. A shifter circuit which utilizes the value of $2^n$ to shift the product $AM_B$ and thereby obtain Q, preferably by performing a vector multiply that forms a combinational logical shift on $AM_B$.
6. An output register.

Each of these functional electrical circuit elements will be described in detail below.

BRIEF DESCRIPTION OF THE DRAWINGS

FIG. 7 is a schematic diagram showing the manner in which the circuits of FIGS. 3–5 are connected together to obtain a divider circuit which corresponds to the divider of FIGS. 1 and 2.

DETAILED DESCRIPTION OF THE PREFERRED EMBODIMENTS

Figure 1:
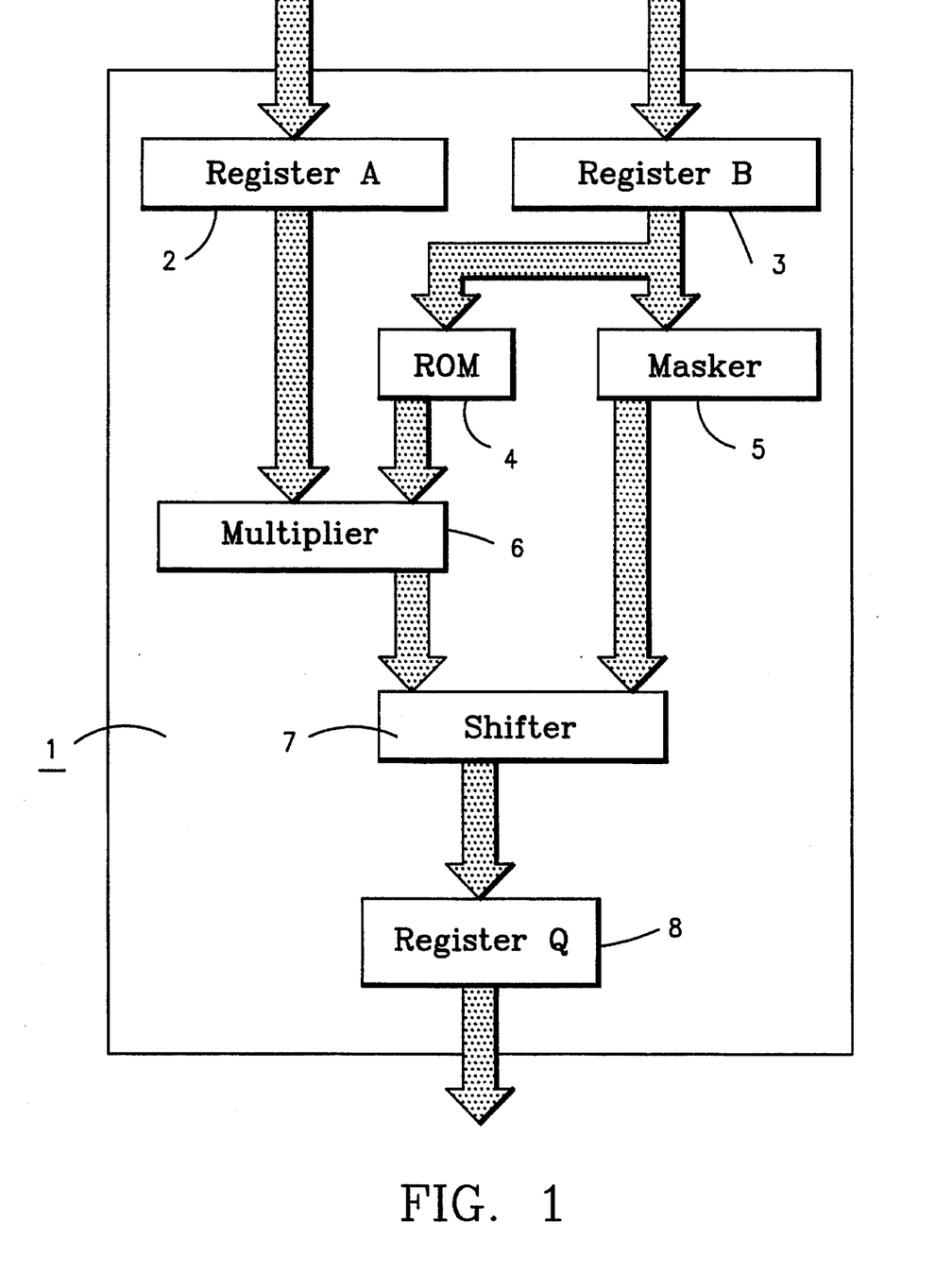
FIG. 1 is a block diagram of the functional layout of a fast modulo divider circuit according to a preferred embodiment of the invention.

FIG. 1 shows a modulo divider 1 constructed in accordance with the principles of a preferred embodiment of the invention. Divider 1 accepts two five-bit digital electronic input signals A and B, and derives one five-bit digital electronic output signal Q, defined by the relationship $$(B * Q) \underset{32}{=} A \tag{9}$$

Because B has no inverse if B is even, an inverse modulo division operator $M_B$ is instead defined as follows:

$$M_B B \underset{32}{=} 2^n, \tag{10}$$

where, if B is odd, n=0, i.e., $M_B$ is the inverse of B, and where n is an element of the set (1, 2, 3, 4) if B is even.

Unlike the ordinary inverse of B, the inverse modulo division operator $M_B$ can easily be shown to exist for all possible values of B in the modulo system. Since $M_B$ exists for all B, then:

$$M_B (B * Q) \underset{32}{=} AM_B. \tag{11}$$

By an associative property of modulo arithmetic, $$(M_B B) * Q \underset{32}{=} AM_B \tag{12}$$

and, by equation 10, $$2^n Q \underset{32}{=} AM_B. \tag{13}$$

Thus, the preferred modulo divider circuit derives Q by processing the electrical input signals to effect a multiplication of A by $M_B$, and subsequently to effect a division of $AM_B$ by $2^n$, n being the number of 2's by which B is integrally divisible.

As illustrated in FIG. 1, the preferred divider 1 is composed of six functional blocks, including a first functional block made up of input registers 2 and 3 to which 5-bit signals representing modulo numbers A and B are input, a look-up table in the form of a ROM 4 for mapping B to $M_B$, a masker circuit 5 which generates a value of $2^n$ that corresponds to a given B, a modulo-32 ripple-through multiplier 6 for multiplying A and $M_B$, a shifter circuit 7 which uses the value of $2^n$ to do a vector multiply that accomplishes a combinational logical shift on the product of A and $M_B$, and an output register 8.

Registers 2 and 3 are conventional registers which may take a variety of forms, including the arrangement shown in FIG. 7, in which registers 2 and 3 are each made up of five individual latches 9–13 and 14–18 for holding individual bits received in serial fashion via input terminals 19 and 20, and for outputting A and B in parallel on the rising edge of a clock pulse input via terminal 21.

Figure 2:
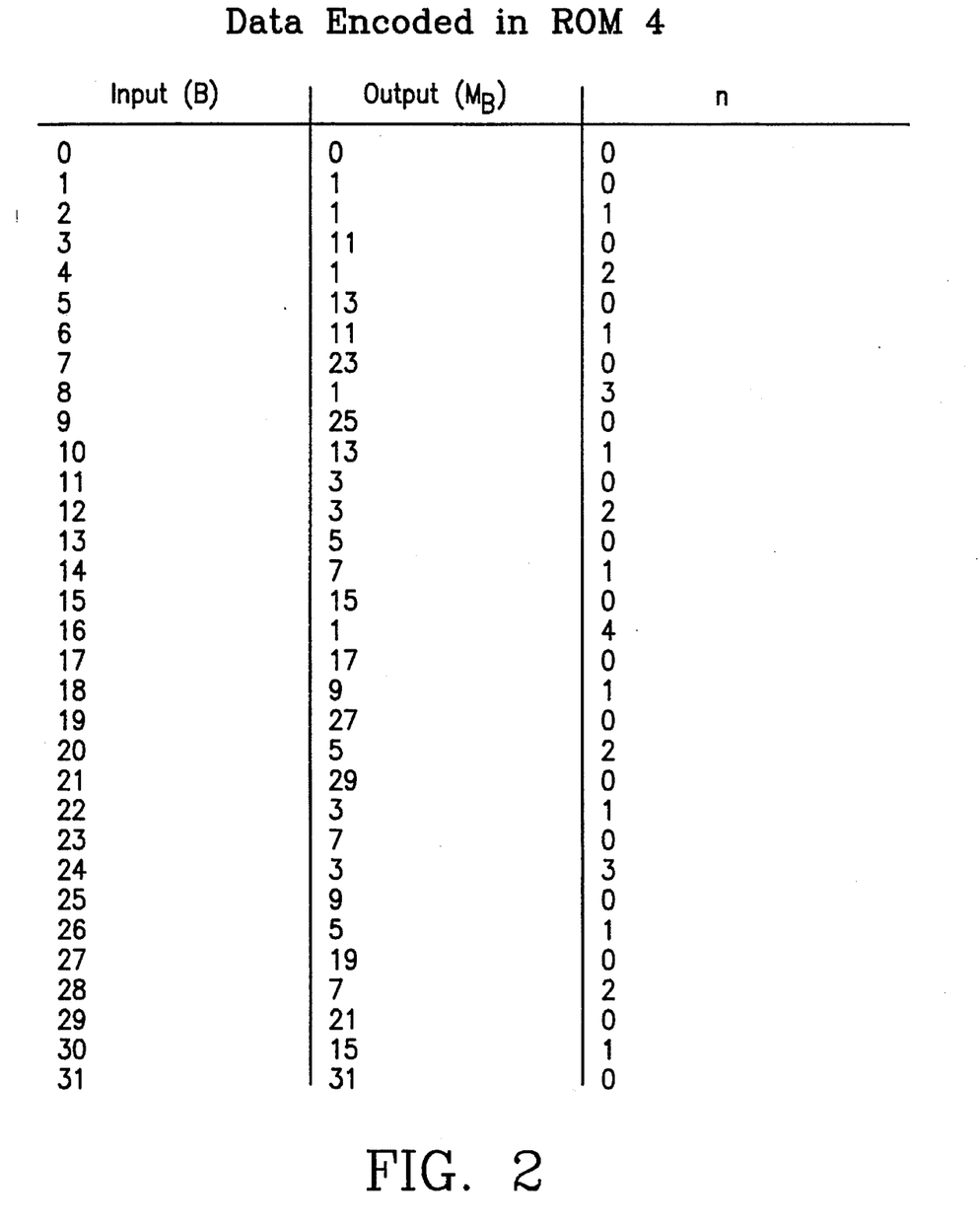
FIG. 2 is a table of look-up values for the ROM shown in FIG. 1.

ROM 4 is encoded with the data listed in FIG. 2. The value of B stored in register 3 is read by ROM 4, which functions as a look-up table to output the values for $M_B$ as defined in equation (10) above. As will be described in more detail below, the value of $M_B$ depends on the position of the least significant non-zero bit in B, since the first n–1 bits of B must be zero in order for B to be divisible by $2^n$. However, n is derived by the shifter circuit 7 and is not determined by the look-up table. The values for n are included in FIG. 2 for reference only.

The values for $M_B$ which are stored in ROM 4 are determined as follows: In order to satisfy equation 10 under the rules of modulo arithmetic, $M_B$ must be equal to $(2^n+32 k)/B$, where k is an integer chosen such that $M_B$ is also an integer, and n is the number of 2's by which B is integrally divisible. In FIG. 2, k was selected to be the smallest value which results in $M_B$ being an integer, but higher values of k which also permit $M_B$ to be an integer could also be used.

Although the look-up table is implemented in the illustrative example by ROM 4, it will be appreciated by those skilled in the art that the look-up or mapping function could also be accomplished by a straight random logic or programmable array logic (PAL) circuit designed to map B onto $M_B$. While the above discussion implies that $M_B$ could also be calculated from n and B, use of a look-up table is much faster. The ROM in question is conventional, except for the data stored therein, and therefore will not be discussed in further detail.

Figure 3:
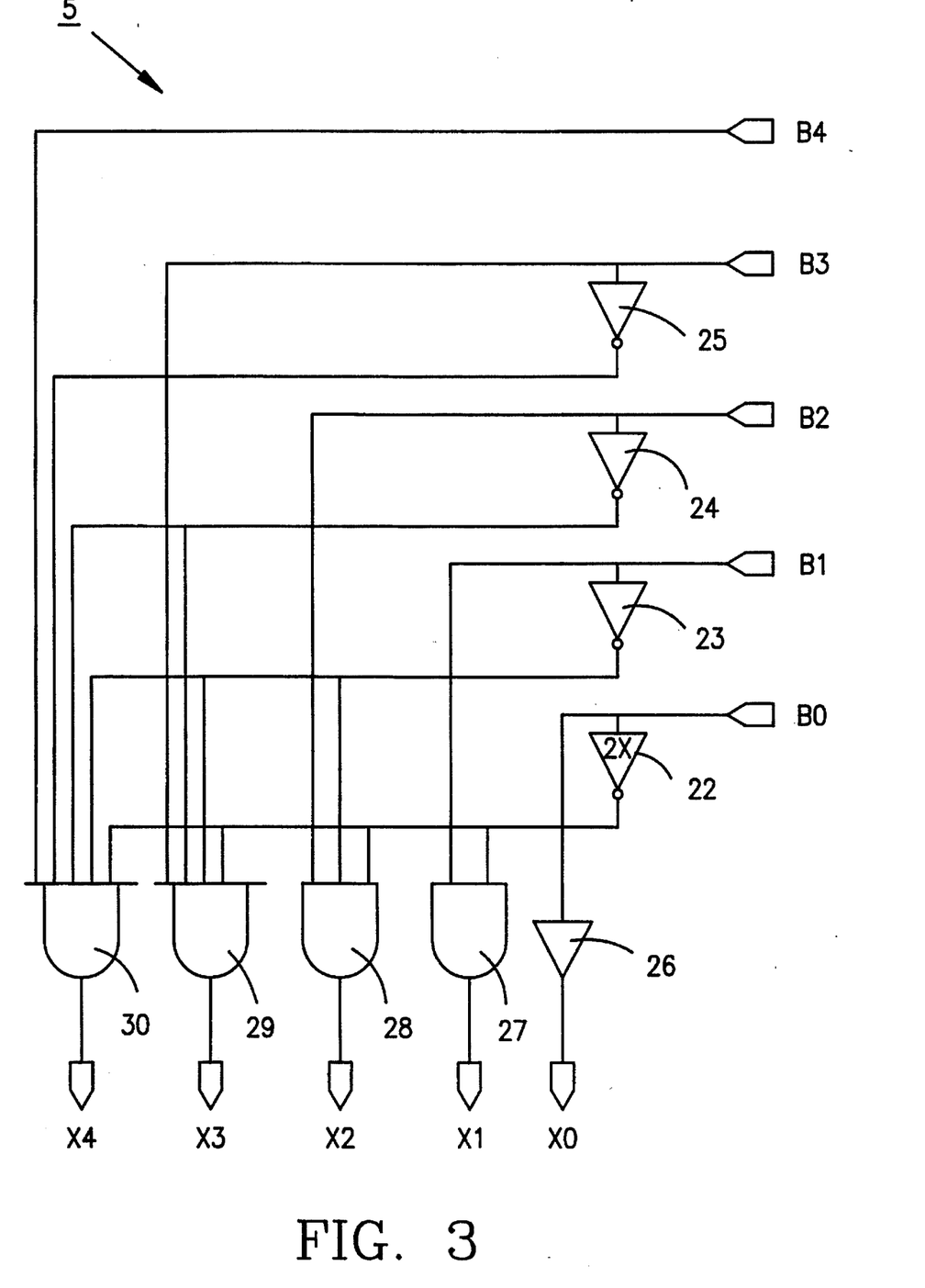
FIG. 3 is a schematic diagram of a masker circuit for use in the divider of FIG. 1.

Masker circuit 5, as shown in FIG. 3, uses a set of four inverters 22–25, one buffer 26, and four AND gates 27–30, one for each output bit, to select the least significant non-zero bit, in order to represent the number of times two divides integrally into B, as shown in FIG. 3. The individual bits of the modulo number B are labeled from B0 to B4 using conventional notation, where a high or logical 1 electrical signal at bit location B0 indicates the number 1 (n=0), a high signal at bit location B1 indicates the number 2 (n=1), a high signal at bit location B2 indicates the number 4 (n=2), and so forth. For m=0 to 4, location Bm therefore represents $2^m$, and B equals B4+B3+B2+B1+B0. The output X has the same form as the input, but the bits are numbered from X0 to X4.

The masker circuit is arranged such that a zero bit at any of the input locations B0 to B4 zeroes the corresponding output location, but produces a high or logical 1 signal at all higher order locations. A "1" bit at location $B_m$, on the other hand, produces a logical 1 at the input to the AND gate of the corresponding output bit $X_m$, and is inverted to produce a zero at all higher order locations (i.e., at bits $X_h$, where h>m). The result is that the inputs to the AND gate corresponding to the first logical 1 are all logical 1's, while all other AND gates are zeroed either directly by the input of the AND gate corresponding to the zero bit, or by the corresponding inverter connected to the first logical 1 bit, which zeroes all higher order AND gates. In other words, masker 5 masks off all bits not in the nth position, where n is the position of the least significant non-zero bit.

More generally, given that $B_m$ represents the mth bit position in B, and $X_m$ represents the mth bit position in the output X, X can be mathematically expressed as:

$$X_m = B_m \overset{(m-1)}{\underset{i=0}{\downarrow\downarrow}} \overline{B_i} \qquad (14)$$

Figure 4:
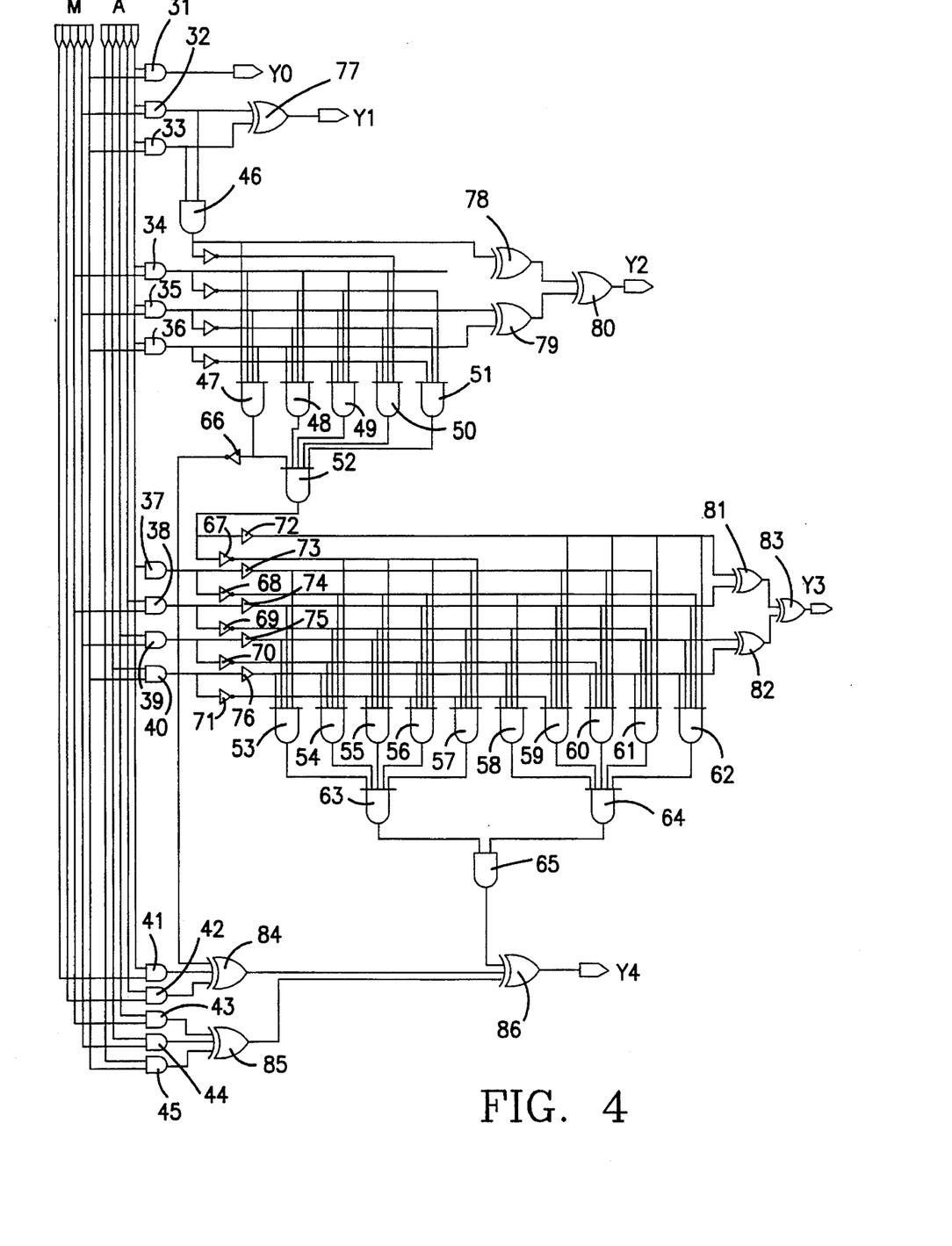
FIG. 4 is a schematic diagram of a multiplier circuit for use in the divider of FIG. 1.

Multiplier 6 is a modified ripple-through multiplier, as shown in detail in FIG. 4. Multiplier 6 outputs a five bit digital signal representing the product of $M_B$ and A by using combinational logic, instead of multiplying by successive shift and adds with several registers. Each output, $Y_0$–$Y_4$, and each carry, is generated based on the following formulas:

$$
\begin{aligned}
Y_0 &= A_0 M_0 \qquad (15)\\
Y_1 &= A_1 M_0 \oplus A_0 M_1 \\
Y_2 &= A_2 M_0 \oplus A_1 M_1 \oplus A_0 M_2 \oplus C_{1-2} \\
Y_3 &= A_3 M_0 \oplus A_2 M_1 \oplus A_1 M_2 \oplus A_0 M_3 \oplus C_{2-3} \\
Y_4 &= A_4 M_0 \oplus A_3 M_1 \oplus A_2 M_2 \oplus A_1 M_3 \oplus A_0 M_4 \oplus C_{2-4} \oplus C_{3-4}
\end{aligned}
$$

where $C_{n-m}$ is the carry from the nth stage to the mth stage.

The multiplier implements these functions directly by parallelly processing the respective Y bits in a plurality of stages. AND gates 31–45 output a logical 1-bit if the corresponding A and $M_B$ bits are one, but they output a zero bit if either of the corresponding A and $M_B$ bits is zero.

A carry occurs if more than one term is equal to 1 as determined by AND gates 46, and 63–65, NAND gates 47–62, and inverters 66–76. The exclusive OR gates 77–86 pass a one bit if an odd number of its inputs are equal to 1, and thus the exclusive OR gates serve to generate the sums of the individual products in equation 15. Because the multiplier performs modulo 32 arithmetic, all sums above the fifth bit, and all carries to sums above the fifth bit, may be disregarded, which reduces the size of the multiplier, and makes the output the modulo 32 result of the multiplication. In other words, the last stage of the multiplier does not require any carry gates.

Figure 5:
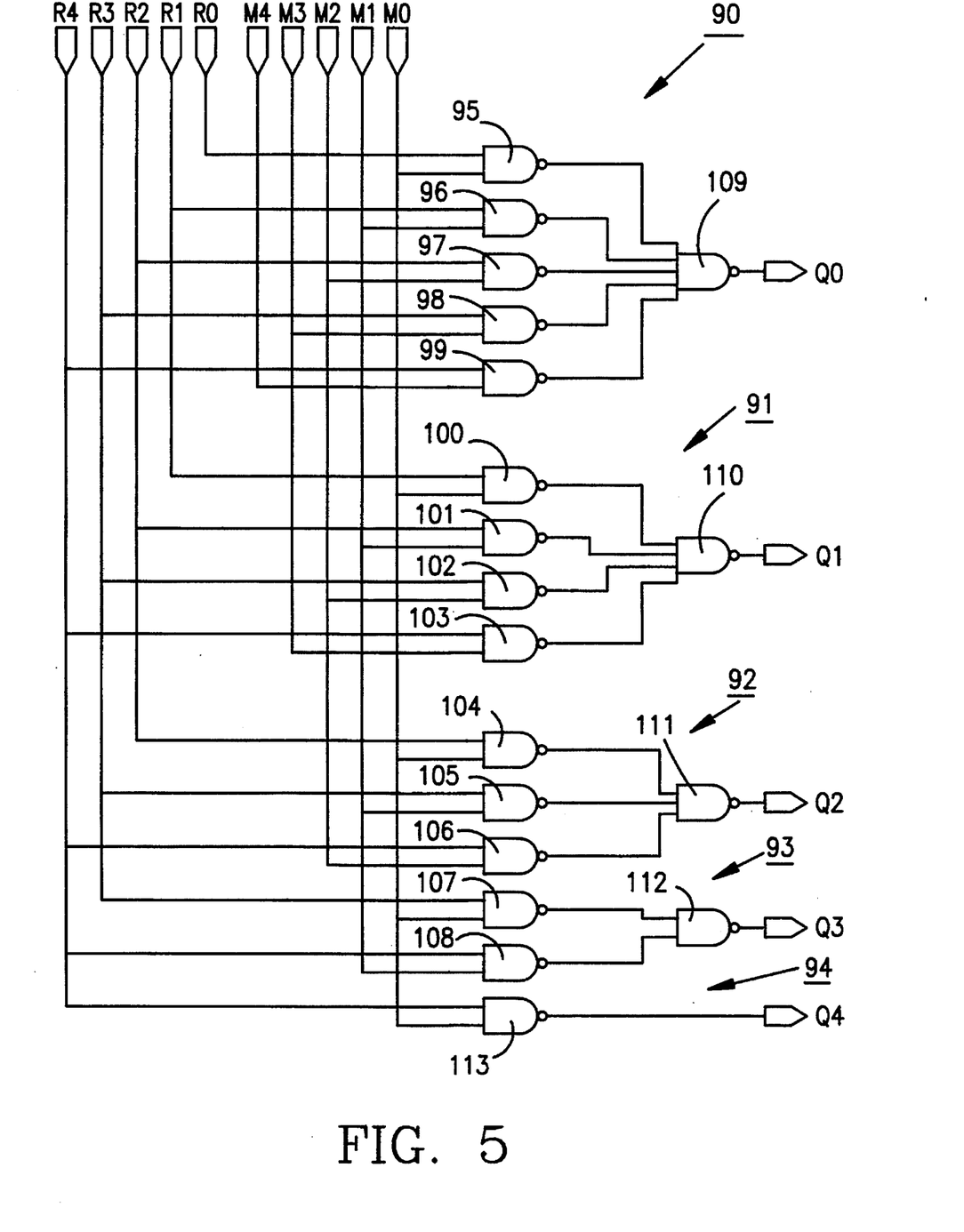
FIG. 5 is a schematic diagram of a shifter circuit for use in the divider of FIG. 1.

The value for n generated by masker 5 (actually $2^n$), and the signal representative of the product of $M_B$ and A which is output by multiplier 6, are input to shifter 7, as shown in FIG. 5. The purpose of shifter 7 is to effectively divide $M_B A$ by $2^n$. Shifter 7 performs a vector-shift and vector-vector multiply simultaneously to accomplish this function. Essentially, shifter 7 takes the value of $2^n$ and uses it to shift the signal output by multiplier 6 n times towards the rightmost or least significant bit. The R inputs of shifter 7 correspond to the Y outputs of multiplier 6. The K inputs of shifter 7 correspond to the X outputs of masker 5. For purposes of the shift operation, the two five-bit numbers are treated as five-vectors. If a logical shift of R to the right n times of R is denoted by R(n), then each output, $Q_0$–$Q_4$ is described as follows:

$$Q_N = K \cdot R(n) \qquad (16)$$

Since K, which is the masked output of masker circuit 5, has only one bit position that is non-zero, namely the nth, the result of the scalar or dot product of K and R will be the nth bit position in R(n). By performing the dot product five times, each time using R shifted one more place to the right, the five elements in Q are generated. In other words, the first stage 90 of the shifter calculates the dot product of K and R to give the Q0 bit. The next stage 91 calculates the dot product of K and R shifted one bit to the right with the right-most bit dropped to give Q1, with successive stages 92, 93, and 94 also calculating the dot product of K and R, R being shifted to the right by one bit for each stage. It will be noted that each time a bit is dropped, one less NAND gate is needed.

Mathematically, the operation of stages 90–94, carried out by NAND gates 95–108 which output a 1 bit unless both corresponding R and K bits are 1, and NAND gates 109–112 which therefore output a 1 bit unless all input bits to the stage are one, is expressed by De Morgan's law as follows:

$$
\begin{aligned}
Q_0 &= \overline{\overline{K_0 R_0}\, \overline{K_1 R_1}\, \overline{K_2 R_2}\, \overline{K_3 R_3}\, \overline{K_4 R_4}} \qquad (17)\\
Q_1 &= \overline{\overline{K_0 R_1}\, \overline{K_1 R_2}\, \overline{K_2 R_3}\, \overline{K_3 R_4}} \\
Q_2 &= \overline{\overline{K_0 R_2}\, \overline{K_1 R_3}\, \overline{K_2 R_4}} \\
Q_3 &= \overline{\overline{K_0 R_3}\, \overline{K_1 R_4}} \\
Q_4 &= K_0 R_4
\end{aligned}
$$

The results from shifter 7 are stored in output register 8 during the next rising edge of the clock pulse after the falling edge which initiates the output from registers 2 and 3.

Figure 6:
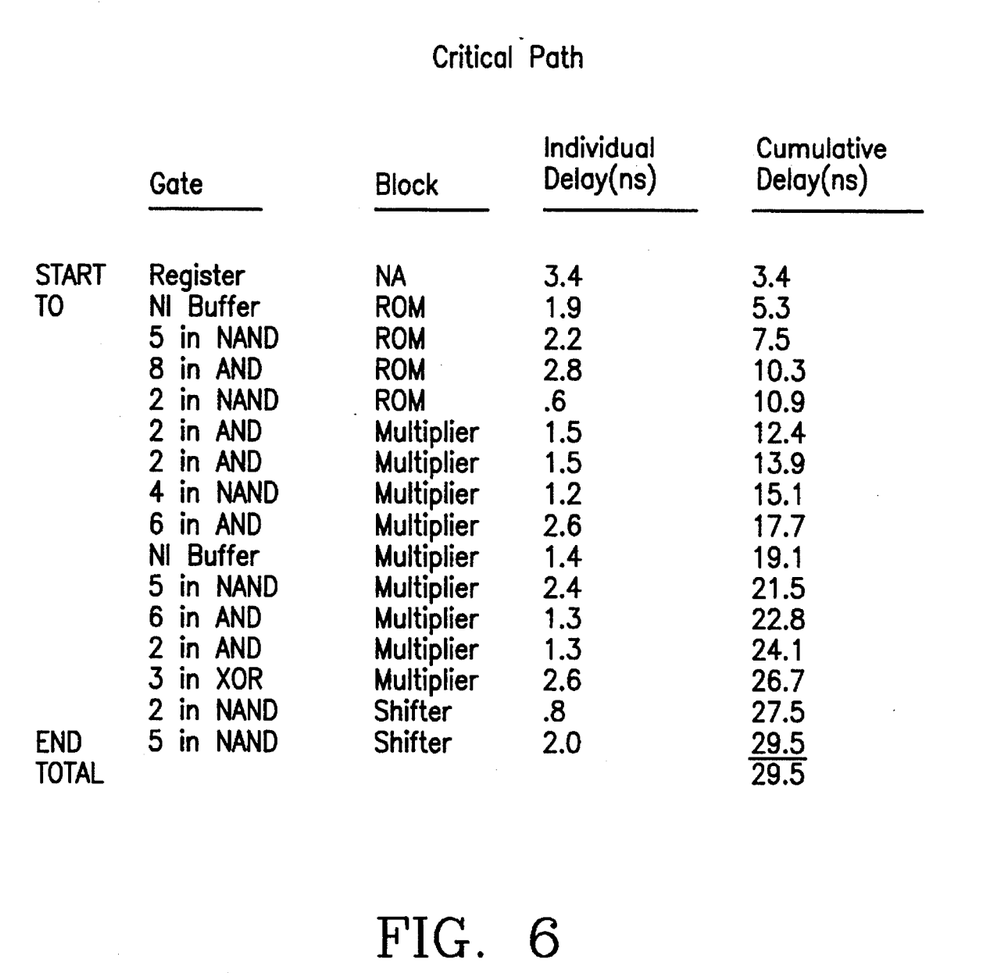
FIG. 6 is a table listing the critical path and worst-case delay time conditions for performing a modulo division operation on a digital input signal using the circuit of FIG. 1.

FIG. 6 lists the critical path through the exemplary circuit implementation shown in FIG. 7. Delay times are given for worst-case conditions, with an output capacitance of 0.26 pF. Delay times for the ROM are based on a combinational circuit similar to a PAL circuit, but will vary based on actual implementation. Larger output capacitances, or the use of I/O pads, would significantly increase delay times.

In practice, as noted above, the input registers 1 and 2 may be in the form of parallelly connected one-bit latches, as may the output register. The input registers are clocked on the rising edge of a clock pulse and the output latches are clocked on the trailing edge of the clock pulse. Functional blocks 4–7 are each in the form of discrete chips or integrated circuits wired together as indicated.

The illustrated device has an approximate power dissipation of 0.29 mW/Mhz, and an equivalent gate count of 333, not including values for the ROM. Both the gate count and AC power dissipation may be varied based on the actual implementation of the ROM. All of these calculated values are based on data given in the VGT Portable CMOS Library by VLSI Technology, with $\lambda=1$.

As noted at various places above, the illustrated embodiment is preferred, but is not intended to be limiting in any way. The specific circuits shown for the various functional blocks may be modified by those skilled in the art to perform the same processing functions in a different manner. In addition, the principles of the invention are applicable not only to 5-bit modulo 32 designs, but also to modulo16, modulo64 and any other modulo system. Consequently, it is intended that the scope of the invention be defined solely by the claims appended hereto.

I claim:

1. A fast arithmetic modulo divider circuit, comprising:
  input register means for receiving two input electrical signals representative of numbers A and B, each signal made up of X digital bits, where X is a whole number greater than 1 and A and B are whole numbers in a modulo system, A and B each having values between 0 and $2^x - 1$;
  look-up table means for mapping B onto an electrical signal representing a modulo division operator $M_B$ which, when multiplied by B, is equal to $2^n$, where n is the number of two's by which B is integrally divisible;
  masker means for generating an electrical signal representative of $2^n$ by outputting an X-bit signal indicative of the least significant non-zero bit present in B;

multiplication means for processing the electrical signals representing $M_B$ and A to obtain an electrical signal representative of the product of $M_B$ and A.

shifter means for physically shifting said electrical signal representative of the product of $M_B$ and A by n places in order to divide $M_B$ A by $2^n$ and obtain an electrical signal Q made up of X digital bits; and output register means for making available for output said electrical signal Q.

2. A modulo divider circuit as claimed in claim 1, wherein said input register means comprises two X bit registers.

3. A modulo divider circuit as claimed in claim 2, where said X bit registers are composed of X individual one bit latches.

4. A modulo divider as claimed in claim 3, wherein outputs of said latches are simultaneously clocked on one edge of a clock pulse and an input to said output register means is clocked on a second edge of said clock pulse.

5. A divider circuit as claimed in claim 2, wherein said two X-bit registers are 5-bit registers and said modulo number system is a modulo 32 system.

6. A modulo divider circuit as claimed in claim 1, wherein said look-up table means comprises a ROM.

7. A modulo divider circuit as claimed in claim 1, wherein said look-up table means includes means for mapping B onto $M_B$, $M_B$ being defined as a modulo number which equals $(2^n+2^x k)/B$, in order to obtain the electrical signal representative of $M_B$, and wherein k is defined as any whole number which results in $M_B$ being an integer.

8. A modulo divider circuit as claimed in claim 7, wherein said means for mapping comprises means for storing values of said modulo number equal to $2^n+32(k)$, where k is the smallest number which results in $M_B$ being an integer.

9. A modulo divider circuit as claimed in claim 1, wherein said masker means comprises five input terminals, B0–B4, and five output terminals X0–X4, and wherein each input terminal $B_m$, where m is a whole number less than 5, is directly connected to an input of an AND gate whose output is the corresponding output terminal $X_m$, and wherein each input $B_m$ is connected through an inverter to inputs of AND gates which are connected to all outputs $X_h$, where h is greater than m.

10. A modulo divider circuit as claimed in claim 1, wherein said multiplier means comprises a ripple-through multiplier which includes one stage for each of the X-bits which make up the electrical signals representing A and $M_B$, wherein said multiplier comprises first multiplier stage means for multiplying a first bit of A by a first bit of $M_B$ to obtain a first bit of the product Y0, second multiplier stage means for multiplying the first bit of $M_B$ by a second bit of A and multiplying a second bit of $M_B$ by the first bit of A, and summing means for summing the bit representing $M_B 0$ A1 and $M_B 1$ A0 to obtain a second bit of the product Y1, each stage including means for generating a carry bit connected to inputs to another stage, wherein an Xth stage of said multiplier does not include means for generating the carry bit.

11. A modulo divider circuit as claimed in claim 10, wherein said first and second multiplier stage means comprises AND gates and said summing means comprises exclusive OR gates and inverters.

12. A modulo divider circuit as claimed in claim 1, wherein said shifter means comprises means for inputting an X-bit output of said multiplier means, said X-bit output of said multiplier means including bits R0–R, and means for inputting an X-bit output of said masker means, individual bits of said X-bit output of said masker means being consecutively numbered from K0 to K; means for generating an electrical signal representative of the scalar product of vectors (R0, R1, R2, R3, R4) and (K0, K1, K2, K3, K4), said scalar product obtaining means comprising a first stage of said shifter means; and means for obtaining scalar products of (R0, R1, R2, R3, R4) and (Km–1, Km–2, Km–3, and Km–4), where m is the number of a stage of said shifter means and is less than or equal to 4, and where if Km–m is less than zero, then the bit is dropped.

13. A modulo divider circuit as claimed in claim 12, wherein each said stage comprises a plurality of NAND gates, each NAND gate having inputs connected to receive a respective one of said bits R0 to R and K0 to K, and a plurality of X second NAND gates, said second NAND gates each having an input connected to an output of each of a respective one of a respective one of said first NAND gates, said outputs of said second NAND gates forming individual bits of the electrical signal representative of Q.

14. A method of processing digital electrical signals, comprising the steps of:

receiving two input electrical signals representative of binary numbers A and B, each made up of X digital bits, where X is a whole number greater than 1 and A and B are whole numbers in a modulo system, A and B each having values between 0 and $2^x-1$;

mapping B onto an electrical signal representing a modulo division operator $M_B$ which, when multiplied by B, is equal to $2^n$, where n is the number of two's by which B is integrally divisible;

generating an electrical signal representing $2^n$ by outputting an X bit signal indicative of the least significant non-zero bit present in B;

processing the electrical signals representing $M_B$ and A to obtain an electrical signal representative of the product of $M_B$ and A;

processing said electrical signals representative of $2^n$ and the product of $M_B$ and A in order to obtain an electrical signal made up of X digital bits and representative of a number Q equal to $AM_B/2^n$; and making available for output an electrical signal representative of Q.

15. A method as claimed in claim 14, wherein said step of mapping comprises the step of X mapping B onto $M_B$, wherein $M_B$ is a modulo number which equals $2^n+32(k)$, and wherein k is any whole number which results in $M_B$ being an integer.

16. A method as claimed in claim 14, further comprising the step of selecting k to be the smallest number which results in $M_B$ being an integer.

17. A method as claimed in claim 14, wherein said step of generating $2^n$ comprises the step of generating an X-bit modulo number by zeroing all bits of B except the least significant nonzero bit.

18. A method as claimed in claim 14, wherein said step of processing the electrical signals representing $M_B$ and A comprises the step of generating a bit Y0 equal to the first bit of A multiplied by the first bit of M, and a bit Y1 equal to the first bit of M multiplied by the second bit of A and the second bit of M multiplied by the first bit of A, using combinational logic stages, each stage including a carry bit generating stage connected to inputs of an adjacent stage, wherein a last stage of said multiplier does not include means for generating the carry bit.

19. A method as claimed in claim 18, wherein each individual product of respective bits is obtained by ANDing the values of the bits together to obtain an intermediate bit, and by passing each intermediate bit through an exclusive OR gate arrangement to respectively generate bits Y0 and Y1.

20. A method as claimed in claim 14, wherein said step of processing said electrical signals representative of $2^n$ and the product of $M_B$ and A comprises the steps of using combination logic circuit elements to generate the scalar product of vectors formed by individual bits of the X-bit electrical signal representing the product of A and $M_B$, and the X-bit electrical signal representing $2^n$, and physical shifting $M_B$ by one bit for each vector product generated.

21. A method as claimed in claim 14, further comprising the step of transferring Q to an output register on the falling edge of said clock pulse.

22. A fast modulo divider circuit, comprising:
input register means for receiving two input electrical signals representative of numbers A and B, each signal made up of X digital bits, where X is a whole number greater than 1 and A and B are whole numbers in a modulo system, A and B each having values between 0 and $2^x-1$;
look-up table means for deriving from the electrical signal representative of the number B and electrical signal representative of a number $M_B$ which, when $M_B$ is multiplied by B, is equal to $2^n$, where n is the number of twos by which B is integrally divisible;
multiplication means for processing said electrical signals A and $M_B$ to obtain an electrical signal representative of the product $M_B A$ of $M_B$ and A; and
shifter means for processing the electrical signal representative of the product $M_B A$ to obtain an electrical signal representative of a number Q which is the result of dividing $M_B A$ by $2^n$.

23. A modulo divider circuit as claimed in claim 22, wherein said input register means comprises two X bit registers.

24. A modulo divider circuit as claimed in claim 23, where said X bit registers are composed of X individual one bit latches.

25. A modulo divider as claimed in claim 24, wherein outputs of said latches are simultaneously clocked on one edge of a clock pulse and an input to an output register means for making available for output said electrical signal representative of number Q is clocked on a second edge of said clock pulse.

26. A divider circuit as claimed in claim 23, wherein said two X-bit registers are 5-bit registers and said modulo number system is a modulo 32 system.

27. A modulo divider circuit as claimed in claim 22, wherein said look-up table means comprises a ROM.

28. A modulo divider circuit as claimed in claim 22, wherein said look-up table means includes means for mapping B onto $M_B$, $M_B$ being defined as a modulo number which equals $(2^n+2^x k)/B$, in order to obtain the electrical signal representative of $M_B$, and wherein k is defined as any whole number which results in $M_B$ being an integer.

29. A modulo divider circuit as claimed in claim 28, wherein said means for mapping comprises means for storing values of said modulo number equal to $2^n+32(k)$, where k is the smallest number which results in $M_B$ being an integer.

30. A modulo divider circuit as claimed in claim 22, wherein said multiplier means comprises a ripple-through multiplier which includes one stage for each of the X-bits which make up the electrical signals representing A and $M_B$, wherein said multiplier comprises first multiplier stage means for multiplying a first bit of A by a first bit of $M_B$ to obtain a first bit of the product Y0, second multiplier stage means for multiplying the first bit of $M_B$ by a second bit of A and multiplying a second bit of $M_B$ by the first bit of A, and summing means for summing the bit representing $M_B 0$ A1 and $M_B 1$ A0 to obtain a second bit of the product Y1, each stage including means for generating a carry bit connected to inputs to another stage, wherein an Xth stage of said multiplier does not include means for generating the carry bit.

31. A modulo divider circuit as claimed in claim 30, wherein said first and second multiplier stage means comprises AND gates and said summing means comprises exclusive OR gates.

* * * * *